United States Patent [19]  [11] 4,340,530
Higashiguchi et al. [45] Jul. 20, 1982

[54] VINYL CHLORIDE TYPE RESIN COMPOSITION

[75] Inventors: Takeichi Higashiguchi, Tenri; Masasuke Fukuoka, Osaka; Tomoyuki Emura; Yasuhiro Moriuchi, both of Niihama, all of Japan

[73] Assignees: Sumitomo Bakelite Company Limited; Sumitomo Chemical Company Limited, both of Japan

[21] Appl. No.: 165,329

[22] Filed: Jul. 2, 1980

Related U.S. Application Data

[63] Continuation of Ser. No. 966,721, Dec. 5, 1978, abandoned.

[30] Foreign Application Priority Data

Dec. 8, 1977 [JP] Japan .............................. 52-146637
Mar. 6, 1978 [JP] Japan .............................. 53-24539
May 22, 1978 [JP] Japan .............................. 53-59989
May 22, 1978 [JP] Japan .............................. 53-59990
May 22, 1978 [JP] Japan .............................. 53-59991

[51] Int. Cl.$^3$ .............................................. C08K 5/52
[52] U.S. Cl. .................................. 524/515; 525/239; 524/516; 524/523; 524/526; 524/525; 524/527; 524/297; 524/296; 524/314

[58] Field of Search ............... 260/30.6 R, 31.8 R, 260/31.8 M; 526/345; 525/235, 239

[56] References Cited

U.S. PATENT DOCUMENTS

| | | | |
|---|---|---|---|
| 3,299,180 | 1/1967 | Wilks | 260/890 |
| 3,644,578 | 2/1972 | Mathieu | 260/876 R |
| 3,705,210 | 12/1972 | Mathieu | 260/876 R |
| 3,711,576 | 1/1973 | Hwa | 525/239 |
| 3,796,776 | 3/1974 | Ide | 525/239 |
| 4,002,702 | 1/1977 | Kuhn | 260/30.6 R |
| 4,128,539 | 12/1978 | Onizawa | 525/235 |
| 4,230,832 | 10/1980 | Wei | 525/235 |

*Primary Examiner*—Paul R. Michl
*Attorney, Agent, or Firm*—Karl W. Flocks

[57] ABSTRACT

A composition comprises 100 parts by weight of a vinyl chloride type resin and 25 to 200 parts by weight of a plasticizer, the vinyl chloride type resin being composed of 1 to 90% by weight of tetrahydrofuran-insoluble gel fraction and the balance of tetrahydrofuran-soluble fraction. This composition gives a rubbery elastomer having an excellent heat deformation resistance and an excellent matt finish and a small compression permanent set. Though it is close to rubber in properties, the composition has a moldability and processability similar to those of conventional thermoplastic resins, and can be formed into a sheet for interior material of automobile, a packing, a tube, etc.

14 Claims, No Drawings

VINYL CHLORIDE TYPE RESIN COMPOSITION

This is a continuation of application Ser. No. 966,721, filed Dec. 5, 1978, now abandoned.

This invention relates to a vinyl chloride type resin composition having an excellent heat deformation resistance and an excellent matt finish and a small compression permanent set.

In general, vinyl chloride type resins are widely employed in extrusion molding, injection molding, blow molding, etc. because there can be obtained a molded article having good glossy appearance. However, the gloss of this type of resin is regarded as a fault in some uses. That is, when they are used as an interior material of automobile, the gloss brings about too intense a reflection of light and a sticky feeling of surface and provdes an unaesthetic cheap appearance as represented popularly by the term "vinyl gloss". For this reason, a material having a good matt finish has been demanded.

It is also generally known that a moldable composition having a soft and rubbery touch, namely the so-called soft vinyl chloride resin composition, can be obtained by adding a plasticizer to a vinyl chloride resin. However, general soft vinyl chloride resins are poor in heat deformation resistance and creep characteristics and inferior to rubber in recovery from stress, so that their application to uses requiring a heat deformation resistance and a small compression permanent set, such as packing, tube, sheet and wire coating, is limited. For example, general vulcanized rubbers have a compression permanent set (hereinafter, the values of compression permanent set are those determined according to JIS K-6301 under the conditions of 70° C., 22 hours and 25% compression) as small as about 20 to 45% and are excellent in creep characteristics, whereas general soft vinyl chloride resins have a compression permanent set as great as about 55 to 80% and are poor in creep characteristics. Regarding matt appearance, various methods have been devised so far in order to satisfy the above-mentioned requirement. Thus, with the aim of obtaining a matt finish, the following have been proposed: a method comprising incorporating an inorganic filler such as calcium carbonate, talc, clay or the like into a vinyl chloride resin in order to roughen the surface of molded article; a method comprising elevating the degree of polymerization of vinyl chloride resin to increase its melt viscosity in order to extinguish the gloss; and a method comprising incorporating an organic filler and allowing it to decompose or react to extinguish the gloss. However, in all these methods, the matt finish can be realized only in a narrow range of molding conditions and is apt to lack uniformity.

Those skilled in the art can easily think of using a vinyl chloride resin having a high degree of polymerization of, for example, 10,000 or more in order to produce a molded article having a small compression permanent set. However, this technique poses various problems in processing such as reduction of productivity which results in an extremely high cost, a high temperature necessary for melting a polymer of high degree of polymerization which necessitates a high stability and a high extrusion force, and so on.

In view of the above, extensive studies have now been conducted with the aim of providing a vinyl chloride type resin composition free from the above-mentioned disadvantages, and as a result, it has been found surprisingly that a vinyl chloride resin containing 1 to 90% by weight of tetrahydrofuran-insoluble gel fraction which has hitherto been regarded in the art as lacking commercial value and unutilizable has an excellent matt finish, and is broader in range of molding conditions than conventional vinyl chloride resin.

Further, it has now been found that said vinyl chloride resin containing 5 to 90% by weight of tetrahydrofuran-insoluble gel fraction can give a molded article having an excellent heat deformation resistance and a smaller compression permanent set.

The term "tetrahydrofuran-insoluble gel fraction" used herein means the residue of extraction obtainable by extracting a polymer with hot tetrahydrofuran for 22 hours by means of Soxhlet's extractor with a 350 mesh filter.

It is an object of this invention to provide a vinyl chloride resin composition which is excellent in matt finish under broad range molding conditions. It is another object of this invention to provide a vinyl chloride resin composition which can give a molded article having a heat deformation resistance and a compression permanent set as small as less than about 50%, in addition to the above-mentioned advantages.

According to this invention, there is provided a vinyl chloride type resin composition which has excellent matt finish comprising 100 parts by weight of a vinyl chloride type resin and 25 to 200 parts by weight of a plasticizer, said vinyl chloride type resin being composed of 1 to 90% by weight of tetrahydrofuran-insoluble gel fraction (hereinafter referred to as gel) and the balance of tetrahydrofuran-soluble fraction.

The composition of this invention is characterized in that a vinyl chloride type resin component contains 1 to 90% by weight of gel, preferably 5 to 90% by weight, more preferably 5 to 80% by weight, of gel. Particularly, when the gel content is 5 to 90% by weight, not only the composition can have an excellent matt finish but also the composition can give a molded article having an excellent heat deformation resistance and a small compression permanent set.

When the amount of gel in vinyl chloride type resin is smaller than 1% by weight, no matt finish can be observed. If the gel content exceeds 90% by weight, a matt finish can be achieved but there arise various problems in processing and practical use such as poor kneading performance and bad surface state of molded article.

On the other hand, the tetrahydrofuran-soluble fraction is not subject to particular limitation. However, the average degree of polymerization of the soluble fraction is preferably in the range of 400 to 10,000, more preferably 700 to 7,000.

The vinyl chloride type resin used in the composition of this invention, composed of 1 to 90% by weight, preferably 5 to 90% by weight, of gel and the balance of tetrahydrofuran-soluble fraction, can be produced either directly by polymerization, or by blending a gel-containing vinyl chloride type resin produced as above with a usual vinyl chloride type resin containing no gel so that the gel content in the mixture is 1 to 90% by weight, preferably 5 to 90% by weight, or by blending the gel with a usual vinyl chloride type resin free from gel so that the gel content in the mixture is 1 to 90% by weight, preferably 5 to 90% by weight.

The direct production of the gel itself or the gel-containing vinyl chloride resin having a gel content of 1 to 90% by weight can be carried out by adding a polyfunctional compound to the usual polymerization system of vinyl chloride or a mixture thereof with a minor amount of ethylenically unsaturated monomers copolymerizable therewith, and polymerizing them so as to form any desired amount of gel. Examples of said polyfunctional compound include diallyl esters of phthalic acid such as diallyl phthalate, diallyl isophthalate, and diallyl terephthalate; diallyl esters of ethylenically unsaturated dibasic acids such as diallyl maleate, diallyl fumarate, diallyl itaconate and the like; diallyl esters of saturated dibasic acids such as diallyl adipate, diallyl azelate, diallyl sebacate and the like; diallyl ether; triallyl cyanurate; triallyl isocyanurate; triallyl trimellitate; divinyl ethers such as ethylene glycol divinyl ether, butanediol divinyl ether, decane divinyl ether, octadecane divinyl ether and the like; dimethacrylic esters or diacrylic esters of polyhydric alcohols such as ethylene glycol dimethacrylate, diethylene glycol dimethacrylate, triethylene glycol dimethacrylate, diethylene glycol diacrylate, triethylene glycol diacrylate and the like; trimethacrylic esters or triacrylic esters of polyhydric alcohols such as trimethylolpropane trimethacrylate, trimethylolethane trimethacrylate, trimethylolpropane triacrylate, trimethylolethane triacrylate, tetramethylolmethane triacrylate and the like; bismethacryloyloxyethylene phthalate; 1,3,5-triacryloylhexahydrotriazine and the like. The quantity of said polyfunctional compound to be added can be determined without difficulty by a preliminary experiment.

Examples of said ethylenically unsaturated monomers copolymerizable with vinyl chloride include α-olefines, vinyl esters of fatty acids, vinylidene halides, alkyl acrylates, alkylmethacrylates, acrylonitrile, alkyl vinyl ethers, styrene and derivatives thereof.

In the composition of this invention, the plasticizer is used for the purpose of softening the molded article obtained. The amount thereof may be varied depending upon the use of the molded article. However, if the amount of plasticizer is less than 25 parts by weight per 100 parts by weight of vinyl chloride type resin, a high fusion temperature and a high extrusion force are necessary so that the composition is difficult to process, and the molded article is bad in appearance and brittle. If the amount of plasticizer exceeds 200 parts by weight, it cannot dry up and exudes out of the molded article to make the surface sticky, so that many undesirable problems arise with regard to processing and practical use. Examples of the plasticizer include alkyl esters of aromatic polybasic acids such as dibutyl phthalate, dioctyl phthalate, butyl benzyl phthalate and the like; alkyl esters of aliphatic polybasic acids such as dioctyl adipate, dioctyl azelate, dioctyl sebacate and the like; and esters of phosphoric acid such as tricresyl phosphate and the like.

Though the vinyl chloride type resin composition of this invention can be utilized as it is, it may be put to use in admixture with other thermoplastic resins, rubbers, heat stabilizers, fillers, pigments, processing adjuvants and the like.

As said other thermoplastic resins, ethylene-vinyl acetate copolymer, chlorinated polyethylene, acrylonitrile-butadiene-styrene resin, acrylonitrile-styrene resin, urethane elastomer, acrylic resin or the like may be used. As said rubber, acrylonitrile-butadiene rubber, chloroprene rubber or the like may be used.

Examples of said heat stabilizers usable include lead type heat stabilizers such as tribasic lead sulfate and the like; tin type stabilizers such as dibutyltin maleate and the like; and metallic soaps such as zinc stearate, calcium stearate and the like. Usually, said stabilizers are used in an amount of 5% by weight or less.

Examples of said filler usable include carbon black, clacium carbonate, titanium oxide, talc, asbestos, aluminum hydroxide, magnesium hydroxide, zinc oxide and the like. Usually, said filler is used in an amount of 100% by weight or less.

Examples of said pigment include carbon black for pigment, chromium yellow, titanium oxide for pigment, phthalocyanine green and the like. Usually, said pigment is used in an amount of 5% by weight or less.

As said processing adjuvant, those conventionally used in vinyl chloride type resins such as low molecular weight polyethylene, higher fatty acid esters and the like may be used. Usually said processing adjuvant is added in an amount of 5% by weight or less.

The vinyl chloride type resin according to this invention, containing the gel, can be pelletized or molded by the same process as applied to the conventional vinyl chloride type resins. That is, the resin is mixed with plasticizer, stabilizer, etc. by means of a mixer such as super mixer, blender or the like and then kneaded and pelletized by means of a Banbury mixer, roll, extruder or the like. It is a matter of course that the resin composition does not differ from conventional vinyl chloride type resins in respect of processability even in the state of mixed powder. The pellets obtained by the pelletization process can be molded by injection, extrusion or press in the same manner as general vinyl chloride type resins, with the same good moldability as general vinyl chloride type resins. However, the molded article thus obtained differs from those of general vinyl chloride type resins in that the former shows a better matt appearance and a smaller compression permanent set than the latter.

In spite of the fact that a packing, tube, sheet and wire coating obtained from the vinyl chloride type resin composition of this invention have a matt surface, heat-deformation resistance and creep characteristics close to rubber, the vinyl chloride type resin composition of this invention can surprisingly be molded similarly to general thermoplastic resins. Herein, the term "packing" means a part used in automobile, electrical instruments, constructions, foods and the like for the purpose of absorbing shock or shielding. The term "tube" used herein means a part which is used in automobile particularly in the coating of iron wires such as cableway tube, tubings in engine room, electrical instruments, protecting tubes for electrical wire, constructions, foods and the like for the purpose of transporting liquid, gas or solid through the interior thereof or protecting the inner material against the influence of exterior.

The term "sheet" used herein means a sheet-like part or a part which has been secondarily processed by the method of vacuum molding or the like, put to uses requiring resistance to heat deformation, a low creep and a high matting effect such as automobile particularly dash board sheet, electrical instruments such as planar heater, constructions, kitchen, foods and the like. Because of the general form of the sheet, the molding is predominantly effected by extrusion or roll sheeting. The secondary processing is predominantly carried out by vacuum molding.

The technical content of this invention is illustrated below with reference to Examples, which are by way of illustration and not by way of limitation.

EXAMPLE 1

Into 100-liter autoclave were charged 150 parts by weight of deionized water, 0.1 part by weight of polyvinyl alcohol and an amount as shown in Table 1 of diallyl phthalate, and after deaeration, 100 parts by weight of vinyl chloride monomer was added thereto. With stirring, the mixture was heated to 40.5° C., and polymerization was effected at said temperature for 17 hours.

After the polymerization, the contents were taken out, dehydrated and dried.

The gel content and average degree of polymerization of the vinyl chloride polymer thus obtained were as shown in Table 1.

Then, 80 parts by weight of dioctyl phthalate and 5 parts by weight of tribasic sulfate were added to 100 parts by weight of the vinyl chloride polymer thus obtained, and the mixture was kneaded on rolls at a roll temperature of 180° C. and then pelletized. The pellets were injection-molded or extrusion-molded and the processability and matting effect of the resin were evaluated. The pellets were pressed into a sheet and its compression permanent set was measured. The results are summarized in Table 1.

The results in Table 1 demonstrate the following: If the gel content of the resin is out of the range of 1 to 90% by weight, the matt surface cannot be achieved particularly when the gel content is less than 1% by weight, while the processability decreases and problems arise in the practical use particularly when the gel content exceeds 90% by weight.

TABLE 1

| Run No. | Amount of diallyl phthalate (part by weight) | Polymer formed | | Properties | | |
|---|---|---|---|---|---|---|
| | | Gel content (% by weight) | Average degree of polymerization of soluble fraction | Matt appearance | Processability | Compression permanent set (%) |
| 1 (Comparative Example) | 0 | 0.0 | 2500 | Only at low temperatures | Particularly good | 59.0 |
| 2 (Comparative Example) | 0.01 | 0.5 | 3500 | Only at low temperature | Particularly good | 55.0 |
| 3 | 0.03 | 1.5 | 4100 | Good | Particularly good | 53.0 |
| 4 | 0.05 | 3.0 | 4800 | Good | Particularly good | 51.0 |
| 5 | 0.06 | 4.5 | 5100 | Good | Particularly good | 51.0 |
| 6 | 0.1 | 12.0 | 3700 | Good | Particularly good | 49.0 |
| 7 | 0.2 | 31.0 | 2550 | Particularly good | Particularly good | 48.0 |
| 8 | 0.3 | 55.0 | 1890 | Particularly good | Particularly good | 46.0 |
| 9 | 0.4 | 65.0 | 1550 | Particularly good | Good | 44.5 |
| 10 | 0.5 | 75.8 | 1110 | Particularly good | Fairly good | 43.0 |
| 11 (Comparative Example) | 0.6 | 91.0 | 800 | Uneven in appearance | Bad | 40.0 |

Note:
1. Processability was collectively evaluated by forming the polymer into a pen dish by means of an injection machine (NIKKO-ANKERWERK V-15-75) and observing appearance and flow, and by forming the polymer into a tape by means of a 50 mm extruder and observing the appearance and the like.
   (1) Particularly good: Both appearance and flow are particularly good;
   (2) Good: Both flow and appearance are good;
   (3) Fairly good: Appearance is uniform but flow is somewhat unsatisfactory;
   (4) Bad: The polymer can hardly flow and the appearance is uneven.
2. The surface mat of the same molded article as in Note 1 was evaluated.
   (1) Particularly good: The appearance is even and the matt appearance is remarkable.
   Good: The appearance is even and the matt finish is observable.
   (3) Uneven in appearance: The matt surface is observable but the appearance is uneven and the flow is uneven.
   (4) Only at low temperatures: The matt surface is observable only when the polymer is molded at low temperatures, and gloss occurs when both injection and extrusion-moldings were effected at 180° C. or more (resin temperature).
3. Compression permanent set was measured according to JIS K-6301 under the following conditions: 70° C., 22 hours, compression ratio 25%. Hereinafter, all the results of compression permanent set were those measured under the same conditions as above.

EXAMPLE 2

100 Parts by weight of the gel-containing vinyl chloride polymer prepared according to Run No. 8 of Example 1 was mixed with a quantity as shown in Table 2 of dioctyl phthalate and 5 parts by weight of tribasic lead sulfate and molded in the same manner as in Example 1. Processability, matt surface and compression permanent set were evaluated in the same manner as in Example 1. The results are summarized in Table 2.

TABLE 2

| Run No. | Vinyl chloride polymer | Amount of plasticizer (parts by weight) | Matt Surface | Processability | Compression permanent set (%) |
|---|---|---|---|---|---|
| 12 (Comparative example) | Run No. 8 | 20 | Uneven in appearance | No good | Unmeasurable |
| 13 | " | 50 | Good | Fairly good | 48.0 |
| 14 | " | 75 | Good | Good | 47.0 |
| 15 | " | 100 | Good | Good | 45.0 |
| 16 | " | 150 | Good | Fairly good | 45.0 |
| 17 | " | 180 | Good | Fairly good | 45.0 |
| 18 (Comparative example) | " | 220 | Uneven in appearance | Bad | 45.0 |

Table 2 demonstrates that if the amount of plasticizer in composition is outside the range of this invention, there occurs a reduction of processability or there arises problems in practical use such as unevenness of mat or an increase of compression permanent set.

EXAMPLE 3

To 100 parts by weight of a resin component, prepared by blending 100 parts by weight of the gel-containing vinyl chloride polymer produced according to Run No. 8 of Example 1 with 200 parts by weight of a usual vinyl chloride resin having an average degree of polymerization of 1950 and a gel content of 0%, were added a quantity as shown in Table 3 of dioctyl phthalate and 5 parts by weight of tribasic lead sulfate. The resulting mixture was molded in the same manner as in Example 1 and the processability, matt surface and compression permanent set were evaluated in the same manner as in Example 1. The results obtained are summarized in Table 3.

Table 3 demonstrates that if the amount of plasticizer in composition is outside the range of this invention, there occurs a reduction of processability or there arise various problems in practical use such as unevenness of mat or increase of compression permanent set.

EXAMPLE 4

To 100 parts by weight of a resin, prepared by blending the gel-containing vinyl chloride polymer produced according to Run No. 9 of Example 1 with a usual vinyl chloride resin having an average degree of polymerization of 1950 and a gel content of 0% in a proportion as shown in Table 4, were added 80 parts by weight of dioctyl phthalate and 5 parts by weight of tribasic lead sulfate. The resulting mixture was molded in the same manner as in Example 1 and processability, matt surface and compression permanent set were evaluated in the same manner as in Example 1. The results obtained are summarized in Table 4.

TABLE 3

| Run No. | Amount of plasticizer (parts by weight) | Matt Surface | Processability | Compression permanent set (%) |
|---|---|---|---|---|
| 19 (Comparative example) | 20 | Uneven in appearance | Bad | Unmeasurable |
| 20 | 50 | Good | Fairly good | 49.0 |
| 21 | 75 | Particularly good | Good | 48.0 |
| 22 | 100 | Particularly good | Good | 46.0 |
| 23 | 150 | Particularly good | Fairly good | 46.0 |
| 24 | 180 | Good | Fairly good | 46.0 |
| 25 (Comparative example) | 220 | Uneven in appearance | Bad | 46.0 |

TABLE 4

| Run No. | Vinyl chloride polymer produced in Run No. 9 (parts by weight) | Usual vinyl chloride resin (parts by weight) | Gel content in blended resin (% by weight) | Matt Surface | Processability | Compression permanent set (%) |
|---|---|---|---|---|---|---|
| 26 (Comparative example) | 0 | 100 | 0 | Only at low temperatures | Good | 61.0 |
| 27 (Comparative example) | 1 | 99 | 0.65 | Only at low temperatures | Good | 57.0 |
| 28 | 3 | 97 | 1.95 | Particularly good | Particularly good | 54.0 |
| 29 | 7 | 93 | 4.6 | Particularly good | Particularly good | 51.0 |
| 30 | 10 | 90 | 6.5 | Particu- | Particu- | 49.0 |

TABLE 4-continued

| Run No. | Vinyl chloride polymer produced in Run No. 9 (parts by weight) | Usual vinyl chloride resin (parts by weight) | Gel content in blended resin (% by weight) | Matt Surface | Processability | Compression permanent set (%) |
|---|---|---|---|---|---|---|
| 31 | 30 | 70 | 19.5 | Particularly good | Particularly good | 48.0 |
| 32 | 60 | 40 | 39.0 | Particularly good | Good | 47.0 |
| 33 | 90 | 10 | 58.5 | Good | Good | 45.0 |

Table 4 demonstrates that if the gel content in the blended resin is less than 1% by weight the matt surface can manifest itself only at low temperatures.

EXAMPLE 5

Into a 100-liter autoclave were charged 150 parts by weight of deionized water, 0.1 part by weight of polyvinyl alcohol, 0.04 part by weight of diisobutyl peroxydicarbonate and a quantity as shown in Table 5 of a polyfunctional compound as shown in Table 5, and deaerated, to which was then added 100 parts by weight of vinyl chloride monomer. With stirring, the mixture was heated to 43° C., and polymerization was effected at said temperature for 15 hours. After the polymerization, the contents of the autoclave were taken out, dehydrated and dried.

The gel content in the vinyl chloride polymer thus obtained and average degree of polymerization of the soluble fraction in the polymer were as shown in Table 5.

Subsequently, 100 parts by weight of the vinyl chloride polymer obtained above was blended with 100 parts by weight of a usual vinyl chloride resin having an average degree of polymerization of 1950. 100 parts by weight of the blended resin thus obtained was mixed with 80 parts by weight of dioctyl phthalate and 5 parts by weight of tribasic lead sulfate and processed under the same conditions as in Example 1 to evaluate processability, matt surface and compression permanent set on the same judgement as in Example 1. The results obtained are summarized in Table 5.

TABLE 5

| | Polyfunctional compound | | Polymer obtained | | Properties | | |
|---|---|---|---|---|---|---|---|
| Run No. | Name of compound | Amount (parts by weight) | Gel content (% by weight) | Average degree of polymerization of soluble fraction | Matt Surface | Processability | Compressing permanent set (%) |
| 34 | Diallyl maleate | 0.4 | 57 | 1550 | Particularly good | Particularly good | 48.2 |
| 35 | Diallyl adipate | 0.4 | 38 | 2100 | Particularly good | Particularly good | 49.0 |
| 36 | Dially ether | 1.0 | 35 | 2400 | Particularly good | Particularly good | 49.0 |
| 37 | Triallyl cyanurate | 0.5 | 53 | 1670 | Particularly good | Particularly good | 48.5 |
| 38 | Trially isocyanurate | 0.2 | 60 | 1310 | Particularly good | Particularly good | 48.0 |
| 39 | Triallyl trimellitate | 0.2 | 58 | 1600 | Particularly good | Particularly good | 48.3 |
| 40 | Octadecane divinyl ether | 1.0 | 41 | 4260 | Particularly good | Particularly good | 48.9 |
| 41 | Ethylene glycol dimethacrylate | 1.0 | 39 | 2050 | Particularly good | Particularly good | 48.9 |
| 42 | Trimethylolpropane trimethacrylate | 0.5 | 28 | 3800 | Particularly good | Particularly good | 49.2 |
| 43 | Bis-methacryloyloxyethylene phthalate | 0.5 | 40 | 2000 | Particularly good | Particularly good | 48.8 |

EXAMPLE 6

Into a 100-liter autoclave were charged 150 parts by weight of deionized water, 0.1 part by weight of polyvinyl alcohol and a quantity as shown in Table 1 of diallyl phthalate and deaerated, to which was then added 100 parts by weight of vinyl chloride monomer. With stirring, the mixture was heated to 40.5° C. and polymerization was effected at said temperature for 17 hours.

After the polymerization, the contents in the autoclave were taken out, dehydrated and dried. Subsequently, 100 parts by weight of the vinyl chloride polymer obtained above was mixed with 80 parts by weight of dioctyl phthalate and 5 parts by weight of tribasic lead sulfate, and the resulting mixture was kneaded on rolls at a roll temperature of 180° C. and then pelletized.

By means of an extruder, the pellets were molded into a packing having a thickness of 1 mm and a width of 10 mm in order to evaluate the processability of the composition. The packing was thermally bonded to give a rectangular packing having an inside area of 80 mm square and an outside area of 100 mm square which was used as a packing for iron pipe. After setting the packing on the iron pipe, the pipe was heated in an oven at 180° C. for 1 hour and cooled to room temperature, and then water was allowed to run through the pipe at a water pressure 1 kg/cm² to examine the possibility of water leakage.

The results obtained are summarized in Table 6.

TABLE 6

| Run No. | Amount of diallyl phthalate (parts by weight) | Gel content in polymer formed (% by weight) | Processability | Water leakage |
|---|---|---|---|---|
| 44 (Comparative example) | 0 | 0.0 | Good | Much leakage |
| 45 (Comparative example) | 0.01 | 0.5 | Good | Much leakage |
| 46 | 0.03 | 1.5 | Good | No leakage, but wetness in the packing part |
| 47 | 0.05 | 3.0 | Good | No leakage |
| 48 | 0.06 | 4.5 | Good | No leakage |
| 49 | 0.1 | 12.0 | Good | No leakage |
| 50 | 0.2 | 31.0 | Good | No leakage |
| 51 | 0.3 | 55.0 | Good | No leakage |
| 52 | 0.4 | 65.0 | Fairly good | No leakage |
| 53 | 0.5 | 75.8 | Fairly good | No leakage |
| 54 (Comparative example) | 0.6 | 91.0 | No good | No good product is obtained. Evaluation is impossibile. |

Note:
Processability was evaluated by extruding the resin into the above-mentioned molded article having a thickness of 1 mm and a width of 10 mm by means of a 50 mm extruder and observing appearance, shape and amount of extrusion.
 (1) Good: Appearance, shaping and amount of extrusion are both good.
 (2) Fairly good: Amount of extrusion is small though appearance is good
 (3) Bad: Appearance is uneven and good shape cannot be obtained.

EXAMPLE 7

Into a 100-liter autoclave were charged 150 parts by weight of deionized water, 0.1 part by weight of polyvinyl alcohol and 0.2 part by weight of diallyl phthalate, and deaerated, to which was then added 100 parts by weight of vinyl chloride monomer. With stirring, the mixture was heated to 40.5° C. and polymerization was effected at said temperature for 17 hours. The reaction product was dehydrated and dried to give a partially crosslinked vinyl chloride polymer having a gel content of 31% by weight. With 100 parts by weight of the vinyl chloride polymer thus obtained were mixed 80 parts by weight of dioctyl phthalate and 5 parts by weight of tribasic lead sulfate, and the resulting mixture (A) was kneaded on rolls at a roll temperature of 180° C. and then pelletized. By means of an extruder, the pellet was extrusion molded into a tube having an outer diameter of 15 mm and an inner diameter of 11 mm. For the sake of comparative test, a usual vinyl chloride resin having an average degree of polymerizaton of 1950 and a gel content of 0%, was mixed with the same quantity of the same plasticizer as above to give a mixture (B), and the latter was formed into an extruded tube under the same conditions as above.

In order to evaluate heat deformation resistance of the tube thus obtained, the tube was cut to a length of 25 mm, set in an oven kept at 180° C. in an upstanding state and its shape was observed after the lapse of 1 hour. In order to evaluate its creep characteristics, the tube was cut to a length of 100 mm, hung in an oven kept at 140° C. fixing its upper end and attaching a 100 g weight to its lower end, and its state was observed. The results obtained are summarized in Table 7.

TABLE 7

| Composition | Heat deformation resistance | Creep characteristics |
|---|---|---|
| (A) | Substantially no deformation | Substantially no deformation |
| (B) (Comparative example) | Melted | Elongated and then broken, whereby the weight fell. |

The results of Table 7 demonstrate that the composition (A) of this invention is superior to composition (B) prepared from usual vinyl chloride resin in heat deformation resistance and creep characteristics.

EXAMPLE 8

Into a 100-liter autoclave were charged 150 parts by weight of deionized water, 0.1 part by weight of polyvinyl alcohol and 0.2 part by weight of diallyl phthalate and deaerated, to which was then added 100 parts by weight of vinyl chloride monomer. With stirring, the mixture was heated to 40.5° C. and polymerization was effected at said temperature for 17 hours. The reaction product was dehydrated and dried to give a partially crosslinked vinyl chloride polymer having a gel content of 31% by weight. With 100 parts by weight of the vinyl chloride polymer thus obtained were mixed 60 parts by weight of dioctyl phthalate and 5 parts by weight of tribasic lead sulfate to give a mixture (A), which was kneaded on rolls at a roll temperature of 180° C. and then pelletized. By means of an extruder equipped with a T die, the pellets were extruded to give a sheet having a thickness of 0.5 mm and a width of 500 mm. For the sake of comparison test, a usual vinyl chloride resin having an average degree of polymerization of 850 and a gel content 0%, was mixed with the same quantity of the same plasticizer and stabilizer as above to give a mixture (B) and the latter was extrusion-molded into a sheet under the same conditions as above.

In order to evaluate the heat deformation resistance of this sheet, this sheet was formed into a cup-shaped molded article having a diameter of 50 mm and a height of 40 mm by the process of vacuum molding, and the cup was allowed to stand in an oven kept at 150° C. for 1 hour, observing the change in its shape. In order to evaluate creep characteristics of the sheet, the sheet was punched out to obtain a rectangular specimen having a length of 100 mm and a width of 20 mm, and the specimen was hung fixing its upper end and attaching a 50 g weight to its lower end in an oven kept at 140° C., and its change was observed. In order to evaluate the extent of matt surface, the surface state of the sheet was examined. The results obtained are summarized in Table 8.

TABLE 8

| Composition | Heat deformation resistance | Creep characteristics | Matting effect |
|---|---|---|---|
| (A) | Substantially no deformation | Substantially no deformation | Good |
| (B) (Comparative example) | Great deformation | Elongated and then broken, whereby the weight fell | Glossy |

The results shown above demonstrate that the composition (A) of this invention is superior to the composition (B) prepared from usual vinyl chloride resin in heat deformation resistance, creep characteristics and matt appearance.

EXAMPLE 9

With 100 parts by weight of the vinyl chloride polymer of Table 9 were mixed 80 parts by weight of dioctyl phthalate and 5 parts by weight of tribasic lead sulfate, and the resulting mixture was kneaded on rolls at a roll temperature of 180° C. and then pelletized. The pellets were extrusion-molded into an electrical wire having an outer diameter of 2.5 mm and a coating thickness of 0.7 mm to evaluate the processability of the composition including matting effect of the electrical wire. On the other hand, the pellets were pressed into a sheet and its compression permanent set and heat deformation degree were measured. The heat deformation resistance of the composition was evaluated by taking into consideration the values of compression permanent set and heat deformation degree along with the heat resistance at soldering temperature of the wire obtained by extrusion. The results obtained are summarized in Table 9.

TABLE 9

| | Vinyl chloride polymer | | Properties | |
|---|---|---|---|---|
| Run No. | Gel content (% by weight) | Average degree of polymerization of soluble fraction | Heat deformation resistance | Processability |
| 55 (Comparative example) | 0.0 | 2500 | Bad | Δ |
| 56 (Comparative example) | 0.5 | 3500 | Bad | Δ |
| 57 | 1.5 | 4100 | Good | ⊚ |
| 58 | 3.0 | 4800 | Good | ⊚ |
| 59 | 4.5 | 5100 | Good | ⊚ |
| 60 | 12.0 | 3700 | Good | ⊚ |
| 61 | 31.0 | 2550 | Particularly good | ⊚ |
| 62 | 55.0 | 1890 | Particularly good | ⊚ |
| 63 | 65.0 | 1550 | Particularly good | ⊚ |
| 64 | 75.8 | 1110 | Particularly good | Δ ⊚ |
| 65 (Comparative example) | 91.0 | 800 | — | X |

Note:
1. Processability was collectively evaluated by observing the appearance of extruded electrical wire, the extent of matting effect and the speed of extrusion.
 ⊚: Appearance, matt finish and extrusion speed are all particularly good.
 ○ : Appearance, matt finish and extrusion speed are good.
 ○ Δ: Extrusion speed is unsatisfactory though appearance and matt finish are good.
 Δ: Matt finish can manifest itself only at low temperatures though appearance and extrusion speed are good.
 X: The composition hardly flows so that molded article cannot be obtained.
2. Heat deformation resistance was collectively evaluated by measuring heat resistance at soldering temperature of electrical wire and measuring the compression permanent set (JIS K-6301) and heat deformation degree (JIS-K-6723) of pressed product.
 Particularly good: Heat resistance at soldering temperature, compression permanent set and heat deformation degree are particularly good as compared with general vinyl chloride resins.
 Good: Heat resistance at soldering temperature, compression permanent set and heat deformation degree are better than general vinyl chloride resins.
 Bad: The above-mentioned properties are comparable to those of general vinyl chloride resins.
 —: The composition can give no molded article so that evaluation is impossible.

In another experiment, 100 parts by weight of the same vinyl chloride polymer as used in Run No. 61 of Example 9 was mixed with 80 parts by weight of dioctyl phthalate and 5 parts by weight of tribasic lead sulfate, and the resulting mixture was homogenized for 10 minutes by means of a mixer till the resin temperature reached 105° C. and then cooled to ordinary temperature. The powder thus obtained was extrusion-molded into an electrical wire having an outer diameter of 2.0 mm and a coating thickness of 0.7 mm, and evaluation was carried out in the same manner as in Example 9. The results obtained were similar to those in the electrical wire prepared by extruding pellets.

EXAMPLE 10

With 100 parts by weight of the gel-containing vinyl chloride polymer prepared in Run No. 62 of Example 9 were mixed a quantity as shown in Table 10 of dioctyl phthalate and 5 parts by weight of tribasic lead sulfate. The resulting mixture was molded into an electrical wire or pressed in the same manner as in Example 9, and the processability and heat deformation resistance were evaluated in the same manner as in Example 9. The results obtained are summarized in Table 10. Table 10 demonstrates that if the amount of plasticizer in the composition is outside the range of this invention, various problems arise in practical use such as deterioration of processability and decrease in heat deformation resistance.

TABLE 10

| Run No. | Vinyl chloride polymer | Amount of plasticizer (parts by weight) | Properties | |
|---|---|---|---|---|
| | | | Heat deformation resistance | Processability |
| 66 (Comparative example) | Run No. 62 | 20 | — | X |
| 67 | " | 50 | Good | |
| 68 | " | 75 | Good | |
| 69 | " | 100 | Particularly good | |

TABLE 10-continued

| Run No. | Vinyl chloride polymer | Amount of plasticizer (parts by weight) | Properties | |
|---|---|---|---|---|
| | | | Heat deformation resistance | Processability |
| 70 | " | 150 | Good | |
| 71 | " | 180 | Good | |
| 72 (Comparative example) | " | 220 | — | X |

Note:
The meanings of "X", " ", " ", "—", "Good" and "Particularly good" are the same as in Table 9.

EXAMPLE 11

With 100 parts by weight of the gel-containing vinyl chloride polymer prepared according to Run No. 63 of Example 9 was blended 200 parts by weight of a usual vinyl chloride resin having an average degree of polymerization of 1950 and a gel content of 0%. With 100 parts by weight of the blended resin were mixed a quantity as shown in Table 11 of dioctyl phthalate and 5 parts by weight of tribasic lead sulfate. The resulting mixture was extrusion-molded into an electrical wire or pressed in the same manner as in Example 9, and the processability and heat deformation resistance were evaluated in the same manner as in Example 9. The results obtained are summarized in Table 11.

TABLE 11

| Run No. | Amount of plasticizer (parts by weight) | Properties | |
|---|---|---|---|
| | | Heat deformation resistance | Processability |
| 73 (Comparative example) | 20 | — | X |
| 74 | 50 | Good | O |
| 75 | 75 | Good | ◎ |
| 76 | 100 | Particularly good | ◎ |
| 77 | 150 | Good | ◎ |
| 78 | 180 | Good | O |
| 79 (Comparative example) | 220 | — | X |

Note:
The meanings of "X", "◎", "◉", "—", "Good" and "Particularly good" are the same as in Table 9.

What is claimed is:

1. A vinyl chloride resin composition consisting essentially of 100 parts by weight of a vinyl chloride resin and 25 to 200 parts by weight of a plasticizer, said vinyl chloride resin being composed of 28 to 90% by weight of tetrahydrofuran-insoluble gel fraction and the remainder of tetrahydrofuran-soluble fraction, and being
   (1) a polymer obtained by reacting vinyl chloride monomer or a mixture thereof and a minor amount of at least one monomer copolymerizable therewith, with a polyfunctional compound selected from the group consisting of diallyl esters of phthalic acid, diallyl esters of ethylenically unsaturated dibasic acids, diallyl ethers, triallyl cyanurate, triallyl isocyanurate, triallyl trimellitate, divinyl ethers, dimethacrylic and diacrylic esters of polyhydric alcohols, trimethacrylic and triacrylic esters of polyhydric alcohols, bismethacryloyloxyethylene phthalate and 1,3,5-triacryloyl hexahydrotriazine, or
   (2) a blend of (a) said polymer (1) and (b) a usual vinyl chloride type resin free from gel.

2. A composition according to claim 1, wherein the vinyl chloride resin is a polymer obtained by reacting vinyl chloride monomer or a mixture thereof and a minor amount of monomer copolymerizable therewith, with the polyfunctional compound.

3. A composition according to claim 1, wherein the vinyl chloride resin is a polymer obtained by reacting vinyl chloride monomer with the polyfunctional compound.

4. A composition according to claim 1, wherein the vinyl chloride resin is a polymer obtained by reacting a mixture of vinyl chloride monomer and a minor amount of monomer copolymerizable therewith, with the polyfunctional compound.

5. A composition according to claim 1, wherein the vinyl chloride resin is a blend of a conventional vinyl chloride homopolymer or copolymer free from gel with a polymer obtained by reacting vinyl chloride monomer or a mixture thereof and a minor amount of monomer copolymerizable therewith, with the polyfunctional compound.

6. A composition according to claim 1, wherein the vinyl chloride resin is a blend of a conventional vinyl chloride homopolymer or copolymer free from gel with a polymer obtained by reacting vinyl chloride monomer with the polyfunctional compound.

7. A composition according to claim 1, wherein the vinyl chloride resin is a blend of a conventional vinyl chloride homopolymer or copolymer free from gel with a polymer obtained by reacting a mixture of vinyl chloride monomer and a minor amount of monomer copolymerizable therewith, with the polyfunctional compound.

8. A composition according to any one of claims 1-7, wherein said vinyl chloride resin contains the tetrahydrofuran-insoluble gel fraction in an amount of 28 to 80% by weight.

9. A composition according to any one of claims 1-7, wherein said tetrahydrofuran-soluble fraction has an average degree of polymerization of 400 to 10,000.

10. A composition according to any one of claims 1-7, wherein said tetrahydrofuran-soluble fraction has an average degree of polymerization of 700 to 7,000.

11. A packing which has been molded from the composition of any one of claims 1-7.

12. A tube which has been molded from the composition of any one of claims 1-7.

13. A sheet which has been molded from the composition of any one of claims 1-7.

14. An electrical wire which has been coated with the composition of any one of claims 1-7.

* * * * *